United States Patent [19]

Pelton

[11] Patent Number: 5,654,099
[45] Date of Patent: Aug. 5, 1997

[54] METHOD OF IMPROVING ADHESION BETWEEN ALKYLATED CHLOROSULFONATED POLYETHYLENE (ACSM) OR CHLOROSULFONATED POLYETHYLENE (CSM), AND RESORCINOL FORMALDEHYDE LATEX (RFL) TREATED POLYESTER CORD

[75] Inventor: Daniel A. Pelton, Nixa, Mo.

[73] Assignee: Dayco Products, Inc., Dayton, Ohio

[21] Appl. No.: 604,626

[22] Filed: Feb. 21, 1996

[51] Int. Cl.$^6$ .................................................. D02G 3/00
[52] U.S. Cl. ..................... 428/378; 428/380; 428/383; 428/390; 428/395; 156/137; 156/335
[58] Field of Search ..................... 428/290, 380, 428/378, 383, 390, 395; 156/335, 137

[56] References Cited

U.S. PATENT DOCUMENTS

| | | | |
|---|---|---|---|
| 3,060,078 | 10/1962 | Atwell | 156/335 |
| 3,325,333 | 6/1967 | Kigane et al. | 156/331 |
| 3,868,985 | 3/1975 | Georges | 153/330 R |
| 3,888,805 | 6/1975 | Van Gils et al. | 428/295 |
| 4,022,743 | 5/1977 | Patella et al. | 260/29.5 T |
| 4,300,964 | 11/1981 | Chaudhuri | 156/110 A |
| 4,409,055 | 10/1983 | Elmer | 156/307.5 |
| 4,448,813 | 5/1984 | Solomon | 427/381 |
| 4,472,463 | 9/1984 | Solomon | 427/381 |
| 4,520,050 | 5/1985 | Murase | 427/381 |
| 4,988,753 | 1/1991 | Rullman et al. | 524/260 |

*Primary Examiner*—Christopher W. Raimund
*Attorney, Agent, or Firm*—Joseph V. Tassone

[57] ABSTRACT

A method for improving the adhesion of alkylated chlorosulfonated polyethylene (ACSM) and chlorosulfonated polyethylene (CSM) rubber compounds to a resorcinol-formaldehyde latex (RFL) treated polyester reinforcing element using lower than conventional heat set temperatures comprising dipping the element into a RFL dip comprising chlorosulfonated polyethylene; drying the element; heat setting the element at a temperature in the range from about 300° F. to about 425° F. under tension; incorporating the element into the rubber compounds; and curing the element and the rubber compounds. Further, adding an amine functional polyacrylate to the RFL dip prevents failure of the adhesion of the cord at start up temperatures of about –40° F.

16 Claims, No Drawings

5,654,099

METHOD OF IMPROVING ADHESION BETWEEN ALKYLATED CHLOROSULFONATED POLYETHYLENE (ACSM) OR CHLOROSULFONATED POLYETHYLENE (CSM), AND RESORCINOL FORMALDEHYDE LATEX (RFL) TREATED POLYESTER CORD

BACKGROUND OF THE INVENTION

The present invention relates to a method for improving the adhesion of alkylated chlorosulfonated polyethylene (ACSM) and chlorosulfonated polyethylene (CSM) rubber compounds to a resorcinol-formaldehyde latex (RFL) treated polyester reinforcing element, and more particularly, this invention relates to the use of lower than conventional heat set temperatures to set a polyester cord for use in conjunction with an ACSM or CSM polymer system.

In bonding rubber to a reinforcing material in products such as power transmission belts and other reinforced rubber products, the common practice is to treat the material with a RFL latex dip to enhance the bonding of the rubber to the material. Typically, the RFL dip is prepared by mixing an RFL prepolymer with a latex. The RFL prepolymer provides adhesion to the reinforcing material and the latex provides adhesion to the rubber. Where the surface reactivity of the reinforcing material is low, as is the case with polyester cords, the cord is usually pre-treated with a composition which improves its reactivity. Compositions that have been used for this purpose include epoxy resins and isocyanates. Conventionally, belts are prepared by bonding a double-twisted cord to the rubber. The cord is immersed in a RFL dip, dipped into a neoprene latex dip, and transported through a vertical oven where it is heated under tension for a predetermined period of time. This causes the cord to elongate and restructure the polyester. This process is known as "stress elongation" or "heat set". The process dries the adhesives which are coated on the cord. The common RFL dip systems have also been developed for general purpose rubber compounds like natural rubber and styrene-butadiene-rubber. For these rubbers, the latex used in the RFL dip is often a terpolymer based on styrene, butadiene and vinylpyridine. For less reactive rubber compounds, like ACSM and CSM, the common RFL dip systems are not suitable.

In one conventional treatment for polyester cord, the polyester cord receives an initial polyphenylisocyanate treatment at 8 to 15 pounds of tension which is heat activated at a temperature in the range of 300° F. to 425° F. for 120 seconds to react the functional groups of the polyphenylisocyanate with the open bond sites in the cord. A RFL adhesive is coated over the reacted polyphenylisocyanate and dried, preferably in an oven, for 120 seconds at a temperature in the range of 180° F. to 275° F. to evaporate the water from the RFL and to keep the RFL from blistering prior to the heat setting of the cord. The heat setting of the polyester cord at 460° F. for 60 seconds takes place after the adhesives are applied and therefore, the adhesives are subjected to this elevated temperature.

Normal polyester cord treatment temperatures are 470°–475° F. These temperatures are designed to achieve proper heat set and therefore, the optimum properties of the cord. These temperatures are near the melting point of the polyester cord which is in the range of 478° F. to 490° F. Experience has shown that the alignment of the optimum molecular structure in the polyester is achieved at 460° F. at about 8 to 15 pounds of cord tension. Adhesion of polyester to ACSM and CSM rubber compounds is poor at the standard heat set temperature of 460° F. Thus, there is a problem with using these standard heat set temperatures when bonding ACSM or CSM to a RFL-treated polyester cord. It has been found that the adhesion of the polyester cord to ACSM and CSM rubber compounds is greatly reduced at the standard heat set temperature of polyester cord because the RFL reacts vigorously with itself resulting in a crosslink density approaching a full state of cure leaving few, if any, sites available for bonding with the rubber.

Prior art methods of adhering CSM to polyester cord have included the use of neoprene latex and vinyl pyridine latex in the RFL latex dip.

U.S. Pat. No. 3,060,078 to Atwell teaches a method of bonding polyester cord fibers to a CSM rubber compound by treating the cord with a resorcinol-formaldehyde neoprene latex adhesive composition prior to heat setting the treated cord with the CSM rubber compound.

U.S. Pat. No. 3,325,333 to Kigane et al. teaches a method of adhering a polyester cord to a CSM rubber compound by treating the cord with an aqueous adhesive composition containing methylolated blocked organic polyisocyanate and a vulcanizable organic polymer at conventional or normal polyester treating temperatures.

Accordingly, there is a need for a method for improved adhesion between ACSM and CSM rubber compounds to a RFL-treated polyester cord at lower than conventional heat set temperatures.

SUMMARY OF THE INVENTION

The present invention is a method for improving the adhesion of ACSM and CSM rubber compounds to a RFL-treated polyester reinforcing element, preferably a polyester cord, using lower than conventional heat set temperatures.

In one particular embodiment, the method for adhering a polyester cord to the ACSM or CSM rubber compound comprises:

dipping the cord into a resorcinol-formaldehyde latex dip comprising chlorosulfonated polyethylene;

drying the cord;

heat setting the cord at a temperature in the range from about 300° F. to about 425° F. under tension;

incorporating the cord into the ACSM or CSM rubber compounds; and curing the cord and the ACSM or CSM rubber compounds.

The invention improves the adhesion of a RFL-treated polyester cord to ACSM and CSM rubber compounds by heat setting the cord at a lower than conventional temperature. By heat setting the cord at a lower temperature crosslinking of the RFL is controlled such that good adhesion to the cord and rubber is obtained. This allows sufficient open bond sites on the cord for the ACSM and CSM rubber compounds to bond to the belt. It has been found that the polyester cord properties are not significantly affected if the heat set temperature is lowered while the tension applied to the cord is increased. The modulus properties of the cord are not significantly affected until the heat set temperature is reduced to 300° F.

Accordingly, one object of the invention is to improve the adhesion of a RFL-treated polyester cord to ACSM and CSM rubber compounds.

In accordance with another embodiment of the invention an amine functional polyacrylate is added to the RFL dip. At lower than conventional heat set temperatures the crosslink density of the RFL may not be sufficient resulting in a cohesive failure within the RFL itself. The internal crosslink density of the RFL is such that the strength of the rubber is greater than the strength of the lower number of internal RFL crosslink sites.

Therefore, it is a further object of this invention to reduce the RFL failure present in the ACSM/RFL and CSM/RFL systems at lower than conventional heat set temperatures by utilizing an amine functional polyacrylate in the RFL dip. The amine functional polyacrylate surprisingly prevents RFL failure at colder start up temperatures in the range from about 0° F. to about –40° F. by increasing the crosslink density of the ACSM and CSM rubber compounds. It is believed that the amine functional polyacrylate crosslinks the RFL and the epoxy or isocyanate pretreatment and bonds to the ACSM and CSM rubber compounds so completely that the rubber tears before the RFL fails.

DETAILED DESCRIPTION

The invention improves the adhesion of a RFL-treated polyester reinforcing element to ACSM and CSM rubber compounds by heat setting the cord at a lower than conventional heat set temperature. The method of improving the adhesion between ACSM and CSM rubber compounds and RFL-treated polyester cord, according to the invention, provides unexpected good results in rubber tear and adhesion force.

The polyester reinforcing element can be any polyester cord conventionally used in forming rubber reinforced products. Examples of such cords include Dacron 52 available from DuPont Company, type 775T available from Akzo Chemicals Inc. or type 865 available from Hoescht Celanese Corporation.

As a result of the low surface reactivity of the polyester cord, it is desirable to pre-treat the cord with a pre-dip composition in order to enhance the surface reactivity of the polyester cord. The preferred pre-dip composition comprises an isocyanate selected from the group including NR69 from Akzo Chemicals Inc.; Bayhydrol 116 from Bayer AG of Germany; or polymethylene polyphenylisocyanates such as PAPI. PAPI is commercially available under the tradename Mondur MR or Desmodur VK-18 from Bayer AG of Germany. The pre-dip composition may be applied to the polyester cord by spraying, brushing or dipping, preferably dipping. In preparing the pre-dip composition, it is desirable to use a solvent, preferably toluene. While toluene is the preferred solvent, those skilled in the art will appreciate that equivalent solvents can be substituted for the toluene. In preparing the pre-dip composition, it is desirable that the pre-dip composition comprises about 2% to about 15% by weight of an isocyanate and about 85% to about 98% by weight toluene. Preferably the cord is dipped into the pre-dip composition at a temperature from about 300° F. to about 460° F. for about 1 to 2 minutes under tension.

After pre-treating the polyester cord with the pre-dip composition, the cord is then dipped into a RFL dip. The RFL dip is preferably prepared by mixing water, sodium hydroxide, resorcinol and formaldehyde and forming a prepolymer and subsequently adding chlorosulfonated polyethylene, resulting in the RFL dip. Preferably, the RF/CSM ratio by dry weight is from about 0.08 to about 0.66. The chlorosulfonated polyethylene is commercially available under the tradename Hypalon 605 from Burke-Palmason Chemical Company.

It is desirable that the RFL dip further comprises an amine functional polyacrylate. The addition of an amine functional polyacrylate to the RFL dip prevents failure of the adhesion of the cord in a power transmission belt or other reinforced rubber products at start up temperatures of about –40° F. It is believed that the amine functional polyacrylate crosslinks the RFL and the amine functional polyacrylate and bonds to the ACSM or CSM rubber compound. Preferably, the amine functional polyacrylate has a molecular weight in the range of from about 5,000 to about 20,000. It is preferable that the amine functional polyacrylate is present in an amount in the range of about 2% to about 20% based on total solids content. The amine functional polyacrylate is preferably moderately water soluble and has a pH of about 5.5 to 7.0. Preferably, the amine functional polyacrylate is a mixture comprising 50% by weight polyacrylate and 50% by weight water. It is believed that the reaction of the polyacrylate occurs at the amide site. Examples of preferred amine functional polyacrylates include polyamine, polyacrylic, copolymers or hydrolyzed copolymers thereof, polyacrylamide, n-methylol acrylamide, n-isobutoxymethylacrylamide.

It is desirable that the polyester cord be dipped into the RFL dip and then dried for about 2 minutes at about 225° F.

After the polyester cord has been dipped into the RFL dip and dried, the polyester cord is then heat set at a temperature in the range from about 300° F. to about 425° F. under tension. Preferably, the heat setting process occurs for about 60 to about 180 seconds under about 8 to about 18 pounds of cord tension.

It is desirable that the polyester cord is incorporated into ACSM or CSM rubber compounds and cured in a conventional manner to produce rubber bodies such as power transmission belts.

For a more complete understanding of the invention, the following examples are presented to show specific uses of the techniques taught.

EXAMPLE 1

Pre-Dip Composition

The pre-dip composition was prepared by mixing 5% by weight isocyanate and 95% by weight toluene.

RFL Dip

The RFL dip was prepared by mixing 88.6% by weight water, 1.2% by weight 10% sodium hydroxide, 4.2% by weight of a 100% solids resorcinol, and 6.0% by weight of a 37% formalin solution. The dry weight of the resorcinol formaldehyde in this solution is 6.4 pounds per 100 pounds of solution. The components were mixed in order and stirred between each addition until each component was well dissolved and blended. The resin was aged for 6 hours at room temperature, and stirred occasionally, resulting in a RFL prepolymer.

An aqueous solution of chlorosulfonated polyethylene comprising 34.4% water and 65.6% of a 50% solids Hypalon 45 was prepared. The CSM latex was added to the water and stirred until homogenous. The RFL prepolymer was added slowly to the aqueous solution of CSM while continuously stirring the resulting solution. Approximately equal wet weight amounts of CSM/water and RFL prepolymer were combined. The resulting mixture had a dry weight RF/CSM ratio of about 0.19. The resulting RFL dip was aged for 96 hours prior to using.

Several polyester cords were dipped into the pre-dip composition at 350° F. for 2 minutes under 10 pounds of cord tension. The pre-dipped cords were then dipped into the RFL dip and dried in an oven at 225° F. for 2 minutes. Finally, the cords were heat set at various temperatures ranging from 300° F. to 475° F. for 60 seconds under 15 pounds of pull tension. After heat setting, samples were prepared according to ASTM D1871, Method B except that the heat set polyester cord is wound in closely spaced fashion against a first ply of ACSM rubber across the width of the mandrel. A second ply of ACSM rubber is applied to the outer periphery as shown in Method B. One-inch wide samples of cord sandwich are then cut from the mandrel and tested according to Method B results are recorded as peak peel strength (measured in pounds per inch of width) and estimated percent rubber retention on the cord. The results reflect the averages of 10 identical samples taken from the same ACSM/RFL-treated polyester cord heat set at various temperatures.

TABLE I

| HEAT SET TEMP. (°F.) | POUNDS PEEL PER ASTM D1871, METHOD B (LBS) |
| --- | --- |
| 300 | 36 |
| 325 | 37 |
| 350 | 39 |
| 375 | 42 |
| 400 | 38 |
| 425 | 34 |
| 450 | 18 |
| 475 | 11 |

EXAMPLE 2

Several polyester cords were prepared according to Example 1 above. However, the cords were bonded to CSM. The final CSM/RFL-treated polyester cords were then subjected to various peel forces in ASTM D1871, Method B to evaluate the bond performance of the CSM to the RFL-treated polyester cord by determining the percent CSM rubber retained by the cord. The results reflect the averages of 10 identical samples taken from the same CSM/RFL-treated polyester cords.

TABLE II

| HEAT SET TEMP. (°F.) | POUNDS PEEL PER ASTM D1871, METHOD B (LBS) |
| --- | --- |
| 300 | 35 |
| 325 | 34 |
| 350 | 35 |
| 375 | 36 |
| 400 | 34 |
| 425 | 30 |
| 450 | 23 |
| 475 | 11 |

EXAMPLE 3

The same procedures of Example 1 were followed. Also, polyacrylamide, supplied by American Cyanamid Company, was added to the RFL dip. The polyacrylamide was a mixture of 7% polyacrylamide based on total solids content, and 50% by weight water.

Several polyester cords were treated with the pre-dip composition at 350° F. for 2 minutes under 10 pounds of cord tension. The treated cords were then dipped into the adhesive composition and dried at 225° F. for 2 minutes. Finally, the treated cords were heat set at various temperatures ranging from 350° F. to 425° F. for 60 seconds. The final ACSM/RFL-treated polyester cords were subjected to various peel tensions in ASTM D1871, Method B at both 0° F. and at 72° F. to evaluate the bond performance of the ACSM to the RFL-treated polyester cord in lower temperatures. The results reflect the averages of 10 identical samples taken from the same ACSM/RFL-treated polyester cords.

TABLE III

| HEAT SET TEMP. (°F.) | PEEL 72° F. (LBS) | PEEL 0° F. (LBS) |
| --- | --- | --- |
| 350 | 39 | 38 |
| 375 | 58 | 64 |
| 400 | 34 | 39 |
| 425 | 18 | 25 |
| 450 | 14 | 21 |

Having described the invention in detail and by reference to the preferred embodiments thereof, it will be apparent that modifications and variations are possible without departing from the scope of the invention defined in the appended claims.

What is claimed is:

1. A method for improving the adhesion of a polyester reinforcing element to a chlorosulfonated polyethylene rubber compound which comprises:

dipping the element into a resorcinol-formaldehyde latex dip comprising chlorosulfonated polyethylene;

drying the element;

heat setting the element at a temperature in the range from about 300° F. to about 425° F. under tension;

incorporating the element into the rubber compound; and curing the element and the rubber compound.

2. The method of claim 1 wherein the polyester reinforcing element is a polyester cord.

3. The method of claim 1 wherein the element is pre-treated with a pre-dip composition.

4. The method of claim 3 wherein the pre-dip composition comprises about 2% to about 15% by weight polymethylene polyphenylisocyanate and about 85% to about 98% by weight toluene.

5. The method of claim 4 wherein the pre-dip composition is applied to the element at a temperature in the range from about 300° F. to about 460° F. for about 1 to about 2 minutes under tension.

6. The method of claim 1 wherein the resorcinol-formaldehyde latex comprises a resorcinol-formaldehyde prepolymer:chlorosulfonated polyethylene ratio in the range of from about 0.08 to about 0.66, dry weight.

7. The method of claim 1 wherein the heat setting occurs for about 60 to about 180 seconds.

8. The method of claim 1 wherein the heat setting occurs at about 8 to about 18 pounds of cord tension.

9. The method of claim 1 wherein the chlorosulfonated polyethylene rubber compound is an alkylated chlorosulfonated polyethylene rubber compound.

10. A method for improving the adhesion of a polyester reinforcing element to a chlorosulfonated polyethylene rubber compound which comprises:

dipping the element into a resorcinol-formaldehyde latex dip comprising chlorosulfonated polyethylene and an amine functional polyacrylate;

drying the element;

heat setting the element at a temperature in the range from about 300° F. to about 425° F. under tension;

incorporating the element into the rubber compound; and curing the element and the rubber compound.

11. The method of claim 10 wherein the amine functional polyacrylate has a molecular weight of from about 5,000 to about 20,000.

12. The method of claim 10 wherein the amine functional polyacrylate is a mixture comprising about 50% by weight amine functional polyacrylate and about 50% by weight water.

13. The method of claim 12 wherein the amine functional polyacrylate is present in an amount in the range from about 2% to about 20% based on total solids content.

14. The method of claim 10 wherein the chlorosulfonated polyethylene rubber compound is an alkylated chlorosulfonated polyethylene rubber compound.

15. A reinforced rubber body comprising a matrix of cured chlorosulfonated polyethylene or alkylated polyethylene rubber compound reinforced with a polyester reinforcing element prepared by the method of claim 1.

16. A method for improving the adhesion of a polyester reinforcing element to a chlorosulfonated polyethylene rubber compound, wherein the improvement comprises:

applying a resorcinol-formaldehyde latex comprising chlorosulfonated polyethylene to the element;

heat setting the element at a temperature in the range from about 300° F. to about 425° F. under tension;

incorporating the element into the rubber compound; and curing the element and the rubber compound.

\* \* \* \* \*